US009656559B2

(12) United States Patent
Konno et al.

(10) Patent No.: US 9,656,559 B2
(45) Date of Patent: May 23, 2017

(54) NON-CONTACT POWER SUPPLY DEVICE

(75) Inventors: Masaki Konno, Fujisawa (JP); Hiroshi Tanaka, Atsugi (JP); Tomoya Imazu, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 423 days.

(21) Appl. No.: 14/119,561

(22) PCT Filed: Feb. 8, 2012

(86) PCT No.: PCT/JP2012/052804
§ 371 (c)(1),
(2), (4) Date: Nov. 22, 2013

(87) PCT Pub. No.: WO2012/164973
PCT Pub. Date: Dec. 6, 2012

(65) Prior Publication Data
US 2014/0145514 A1    May 29, 2014

(30) Foreign Application Priority Data

May 27, 2011    (JP) .................... 2011-118665

(51) Int. Cl.
*H04B 5/00*    (2006.01)
*B60L 11/18*    (2006.01)
(Continued)

(52) U.S. Cl.
CPC ............. *B60L 11/1811* (2013.01); *B60L 3/00* (2013.01); *B60L 11/182* (2013.01);
(Continued)

(58) Field of Classification Search
CPC ....................................................... H04B 5/00
(Continued)

(56) References Cited

U.S. PATENT DOCUMENTS 5,821,731 A    10/1998  Kuki et al.
5,850,135 A    12/1998  Kuki et al.
(Continued)

FOREIGN PATENT DOCUMENTS

CN        1759329 A       4/2006
CN     101809842 A       8/2010
(Continued)

OTHER PUBLICATIONS

U.S. Appl. No. 14/119,554, filed Nov. 22, 2013, Konno.
(Continued)

*Primary Examiner* — Adi Amrany
(74) *Attorney, Agent, or Firm* — Foley & Lardner LLP

(57) ABSTRACT

Provided is a non-contact power supply device which detects foreign objects interposed between a power transmission coil and a power receiving coil. This non-contact power supply device is provided with a second coil which contactlessly transmits power to or receives power from a first coil at least by means of magnetic coupling, multiple sensors for detecting position shifts between the first coil and the second coil, a position detection means which, on the basis of the output values of the sensors, detects the relative positions of the first coil and the second coil, and a foreign object detection means which compares the output values of the sensors and from these comparison results detects foreign objects between first coil and the second coil.

3 Claims, 8 Drawing Sheets

(51) Int. Cl.
*H01F 38/14* (2006.01)
*B60L 3/00* (2006.01)
*H02J 7/00* (2006.01)
*H02J 7/02* (2016.01)

(52) U.S. Cl.
CPC ....... *B60L 11/1824* (2013.01); *B60L 11/1825* (2013.01); *B60L 11/1829* (2013.01); *B60L 11/1833* (2013.01); *B60L 11/1846* (2013.01); *H01F 38/14* (2013.01); *H04B 5/00* (2013.01); *B60L 2240/622* (2013.01); *B60L 2250/16* (2013.01); *B60L 2270/147* (2013.01); *H02J 7/0004* (2013.01); *H02J 7/025* (2013.01); *Y02T 10/7005* (2013.01); *Y02T 10/7072* (2013.01); *Y02T 10/7291* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
USPC .......................................................... 307/104
See application file for complete search history.

(56) References Cited

U.S. PATENT DOCUMENTS

| | | | |
|---|---|---|---|
| 7,423,422 B2 | 9/2008 | Kubotera et al. | |
| 8,478,482 B2 | 7/2013 | Tan | |
| 8,975,864 B2 | 3/2015 | Kim | |
| 2005/0165461 A1 | 7/2005 | Takeda et al. | |
| 2008/0162048 A1 | 7/2008 | Yang et al. | |
| 2009/0072629 A1 | 3/2009 | Cook et al. | |
| 2009/0079387 A1* | 3/2009 | Jin | H02J 7/0004 320/108 |
| 2009/0175060 A1* | 7/2009 | Onishi | H02J 7/025 363/56.06 |
| 2009/0309748 A1 | 12/2009 | Elgort et al. | |
| 2009/0325487 A1 | 12/2009 | Kamada | |
| 2010/0090524 A1 | 4/2010 | Obayashi | |
| 2010/0235006 A1 | 9/2010 | Brown | |
| 2010/0237709 A1* | 9/2010 | Hall | B60L 11/182 307/104 |
| 2010/0270970 A1 | 10/2010 | Toya et al. | |
| 2010/0277121 A1 | 11/2010 | Hall et al. | |
| 2010/0280678 A1 | 11/2010 | Tate, Jr. et al. | |
| 2010/0295378 A1* | 11/2010 | Suzuki | H02J 7/025 307/104 |
| 2010/0308939 A1* | 12/2010 | Kurs | H02J 5/005 333/219.2 |
| 2011/0082612 A1 | 4/2011 | Ichikawa | |
| 2011/0101788 A1 | 5/2011 | Sun et al. | |
| 2011/0270462 A1 | 11/2011 | Amano et al. | |
| 2012/0038317 A1* | 2/2012 | Miyamoto | H02J 7/025 320/108 |
| 2012/0187757 A1 | 7/2012 | Wechlin et al. | |
| 2012/0311340 A1 | 12/2012 | Naganuma et al. | |
| 2013/0234503 A1 | 9/2013 | Ichikawa | |

FOREIGN PATENT DOCUMENTS

| | | |
|---|---|---|
| JP | 9-130864 A | 5/1997 |
| JP | 9-215211 A | 8/1997 |
| JP | 2003-348774 A | 12/2003 |
| JP | 2005-148968 A | 6/2005 |
| JP | 2009-089464 A | 4/2009 |
| JP | 2009-213295 A | 9/2009 |
| JP | 2010-051089 A | 3/2010 |
| JP | 2010-119246 A | 5/2010 |
| JP | 2010-178499 A | 8/2010 |
| JP | 2010-226945 A | 10/2010 |
| JP | 2010-263663 A | 11/2010 |
| JP | 2010-284006 A | 12/2010 |
| WO | WO-2010/022059 A1 | 2/2010 |
| WO | WO 2010-052785 A1 | 5/2010 |

OTHER PUBLICATIONS

Caceres, M. et al., WLAN-Based Real Time Vehicle Locating System, *IEEE 69th Vehicular Technology Conference*, 2009, pp. 1-5.
Konno, M. et al. USPTO Non-final Office Action U.S. Appl. No. 14/119,554, dated May 12, 2016, 20 pgs.
USPTO Notice of Allowance, U.S. Appl. No. 14/119,554, Oct. 6, 2016, 10 pages.

* cited by examiner

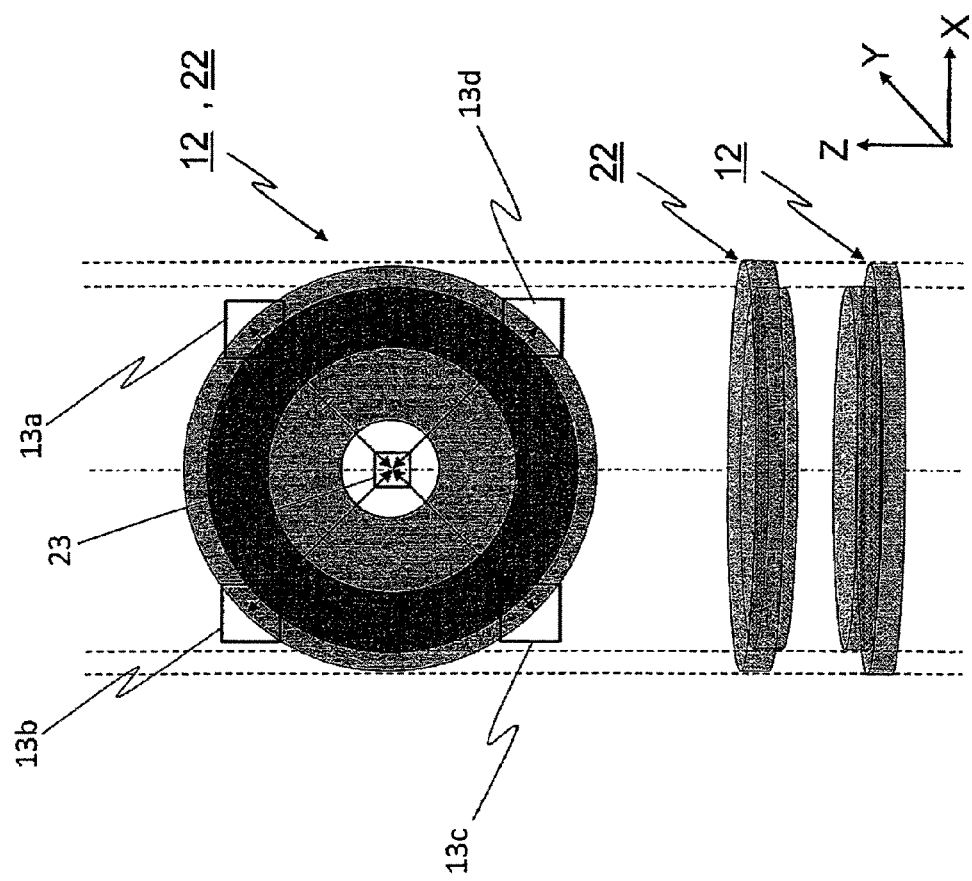

NON-CONTACT POWER SUPPLY DEVICE

TECHNICAL FIELD

The present invention relates to a contactless (i.e. wireless, or inductive) electricity supply device.

BACKGROUND ART

An electricity supply system is known which includes: a power feeding means; a power receiving means for contactlessly receiving power from the power feeding means; an efficiency sensing means for sensing an efficiency of transmission between the power feeding means and the power receiving means; a determination means for determining whether or not the sensed efficiency of transmission is above a prescribed value; and a control means for determining that normal electricity supply is prevented by an obstacle, etc., in response to a condition that the sensed transmission efficiency is below the prescribed value, and temporarily suspending the power feeding of the power feeding means, and restarting power feeding by a small power a prescribed time period after the suspending (see patent document 1).

However, since the efficiency of transmission can be lowered when the power feeding coil and the power receiving coil are deviated in position from each other, it has been impossible to detect on a basis of change in the efficiency of transmission a foreign object coming into between the power feeding coil and the power receiving coil.

It is a problem to be solved by the present invention to provide a contactless electricity supply device that detects a foreign object coming into between a power feeding coil and a power receiving coil.

PRIOR ART DOCUMENT(S)

Patent Document(s)

Patent Document 1: JP 2010-119246 A

SUMMARY OF THE INVENTION

The problem is solved by the present invention comprising: a second coil that sends or receives electricity to or from a first coil contactlessly at least through magnetic coupling therebetween; a plurality of sensors for sensing a positional deviation between the first coil and the second coil; a position sensing means that senses a positional relationship between the first coil and the second coil on a basis of output values of the plurality of sensors; and a foreign object detection means that compares the output values of the plurality of sensors with each other, and detects a foreign object between the first coil and the second coil on a basis of a result of the comparison.

According to the present invention, it is possible to also detect a foreign object between the first and second coils by using the sensors for sensing the positional relationship between the first coil and the second coil, because the output values of the sensors change when the foreign object is put between the first coil and the second coil.

BRIEF DESCRIPTION OF THE DRAWINGS

FIG. 3 shows a condition where the power feeding coil and the power receiving coil included in the contactless electricity supply system of FIG. 1 face each other with no positional deviation, wherein FIG. 3A is a plan view, and FIGS. 3B and 3C are perspective views.

FIG. 4 shows a condition where the power feeding coil and the power receiving coil included in the contactless electricity supply system of FIG. 1 face each other with a positional deviation, wherein

FIG. 5 shows a condition where the power feeding coil and the power receiving coil included in the contactless electricity supply system of FIG. 1 face each other with a positional deviation and a foreign object is present between the power feeding coil and the power receiving coil, wherein

MODE(S) FOR CARRYING OUT THE INVENTION

Figure 1:
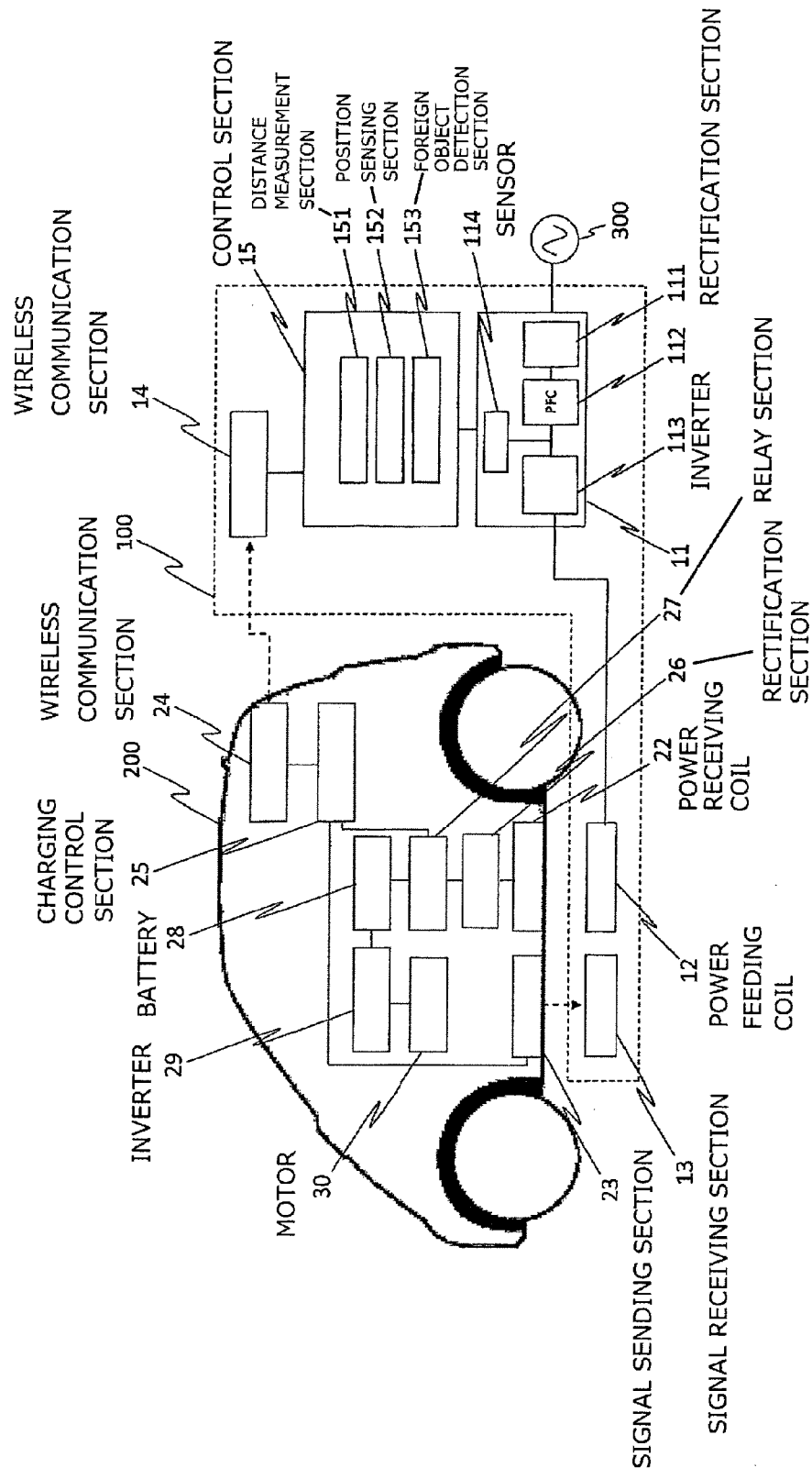
FIG. 1 is a block diagram of a contactless electricity supply system according to an embodiment of the present invention.

The following describes an embodiment of the present invention with reference to the drawings. FIG. 1 is a block diagram of a contactless electricity supply system including a vehicle 200 and an electricity supply device 100, which includes a contactless electricity supply device according to the embodiment of the present invention. A vehicle-side unit of the contactless electricity supply device of the embodiment is mounted on an electric vehicle, but may be mounted on a hybrid electric vehicle or the like.

As shown in FIG. 1, the contactless electricity supply system of this embodiment includes vehicle 200 and electricity supply device 100, wherein vehicle 200 includes the vehicle-side unit, and electricity supply device 100 is a ground-side unit. In this system, power is supplied contactlessly from electricity supply device 100 that is provided in an electricity supply station or the like, to charge a battery 28 that is provided in vehicle 200.

Electricity supply device 100 includes a power control section 11, a power feeding coil 12, a signal receiving section 13, a wireless communication section 14, and a control section 15. Electricity supply device 100 is a ground-side unit that is provided at a parking space where vehicle 200 is parked, and supplies power by contactless electricity supply between coils when vehicle 200 is parked in a specified parking position.

Power control section 11 is a circuit for performing a conversion from an alternating current power sent from an alternating current power source 300 to a high-frequency alternating current power, and sending same to power feeding coil 12. Power control section 11 includes a rectification section 111, a PFC (Power Factor Correction) circuit 112, an inverter 113, and a sensor 114. Rectification section 111 is a circuit that is electrically connected to alternating current power source 300, and rectifies the alternating current power outputted from the alternating current power source 300.

PFC circuit 112 is a circuit for improving the power factor by shaping the waveform outputted from rectification section 111, and is connected between rectification section 111 and inverter 113. Inverter 113 is a power conversion circuit which includes a smoothing capacitor, and a switching element such as an IGBT. Inverter 113 converts a direct current power to a high-frequency alternating current power on a basis of a switching control signal from control section 15, and supplies same to power feeding coil 12. Sensor 114 is connected between PFC circuit 112 and inverter 113, and senses the current and voltage. Power feeding coil 12 is a coil for supplying contactlessly power to a power receiving coil 22 that is provided at vehicle 200. Power feeding coil 12 is provided at a parking space where the contactless electricity supply device of this embodiment is provided.

When vehicle 200 is parked in a specified parking position, power feeding coil 12 is positioned below the power receiving coil 22 at some distance from power receiving coil 22. Power feeding coil 12 is a circular coil that is parallel to the surface of the parking space.

Signal receiving section 13 is a sensor composed of signal receiving antennas, and is provided in electricity supply device 100 on the ground side, and receives an electromagnetic wave, which is sent from signal sending section 23, by measuring the magnetic field around the signal receiving antennas. Each signal receiving antenna is a magnetic field antenna or the like. The frequency of the electromagnetic wave sent and received between signal receiving section 13 and signal sending section 23 is set lower than the frequency of communication between wireless communication section 14 and a wireless communication section 24 which is described below. The frequency of the electromagnetic wave belongs to or close to a frequency band used by a vehicle peripheral device such as an intelligent key. The communication between signal receiving section 13 and signal sending section 23 is implemented by a communication system suitable for close-range communication, as compared to the communication between wireless communication section 14 and wireless communication section 24 which is described below.

Wireless communication section 14 performs bidirectional communication with wireless communication section 24 that is provided at vehicle 200. Wireless communication section 14 is provided at electricity supply device 100 on the ground side. The frequency of communication between wireless communication section 14 and wireless communication section 24 is set higher than the frequency used for communication between signal receiving section 13 and signal sending section 23, and also higher than the frequency used by a vehicle peripheral device such as an intelligent key. Accordingly, the vehicle peripheral device is unlikely to be subject to interference due to communication between wireless communication section 14 and wireless communication section 24. The communication between wireless communication section 14 and wireless communication section 24 is implemented by a wireless LAN system or the like. The communication between wireless communication section 14 and wireless communication section 24 is thus implemented by a communication system suitable for long-range communication, as compared to the communication between signal receiving section 13 and signal sending section 23.

Control section 15 is a section for controlling the whole of electricity supply device 100. Control section 15 includes a distance measurement section 151, a position sensing section 152, and a foreign object detection section 153, and controls power control section 11, power feeding coil 12, signal receiving section 13, and wireless communication section 14. Control section 15 sends to vehicle 200 a control signal indicating a start of power supply from electricity supply device 100, and receives from vehicle 200 a control signal indicating a request of receipt of power from electricity supply device 100, by communication between wireless communication section 14 and wireless communication section 24. Control section 15 performs switching control of inverter 113, and thereby controls power fed from power feeding coil 12, depending on a current sensed by sensor 114.

Vehicle 200 includes power receiving coil 22, signal sending section 23, wireless communication section 24, a charging control section 25, a rectification section 26, a relay section 27, a battery 28, an inverter 29, and a motor 30. Power receiving coil 22 is provided at the bottom surface (chassis) or the like of vehicle 200, and between the rear wheels of vehicle 200. When vehicle 200 is parked in the specified parking position, power receiving coil 22 is positioned above the power feeding coil 12 at some distance from power feeding coil 12. Power receiving coil 22 is a circular coil that is parallel to the surface of the parking space.

Signal sending section 23 is a sensor composed of a signal sending antenna, and is provided at vehicle 200, and sends an electromagnetic wave to signal receiving section 13. The signal sending antenna is a magnetic field antenna or the like. Wireless communication section 24 performs bidirectional communication with wireless communication section 14 provided at electricity supply device 100. Wireless communication section 24 is provided at vehicle 200.

Rectification section 26 is connected to power receiving coil 22, and is composed of a rectification circuit for rectifying to a direct current an alternating current received at power receiving coil 22. Relay section 27 includes a relay switch that is turned on and off under control of charging control section 25. When the relay switch is turned off, relay section 27 separates a higher power system including the battery 28 from a lower power system including the power receiving coil 22 and rectification section 26 which constitute a circuit section for charging.

Battery 28 is composed of a plurality of secondary cells connected to each other, and serves as a power source of vehicle 200. Inverter 29 is a control circuit such as a PWM control circuit including a switching element such as an IGBT. Inverter 29 converts to an alternating current power a direct current power outputted from battery 28, and supplies same to motor 30, depending on a switching control signal. Motor 30 is a three-phase alternating current motor or the like, and serves as a drive source for driving the vehicle 200.

Charging control section 25 is a controller for controlling the charging of battery 28. Charging control section 25 controls the signal sending section 23, and wireless communication section 24. Charging control section 25 sends to control section 15 a signal indicating a start of charging, by communication between wireless communication section 24 and wireless communication section 14. Charging control section 25 is connected via a CAN communication network to a controller not shown which controls the whole of vehicle 200. This controller manages the switching control of inverter 29 and the state of charge (SOC) of battery 28. Charging control section 25 sends to control section 15 a signal indicating a termination of charging, depending on the SOC of battery 28, when full charging is achieved.

In the contactless electricity supply device of this embodiment, power feeding and power receipt of high-frequency power is implemented by electromagnetic induction between power feeding coil 12 and power receiving coil 22 which are out of contact with each other. In other words, when a voltage is applied to power feeding coil 12, then magnetic coupling occurs between power feeding coil 12 and power receiving coil 22, so that power is supplied from power feeding coil 12 to power receiving coil 22.

Figure 2:
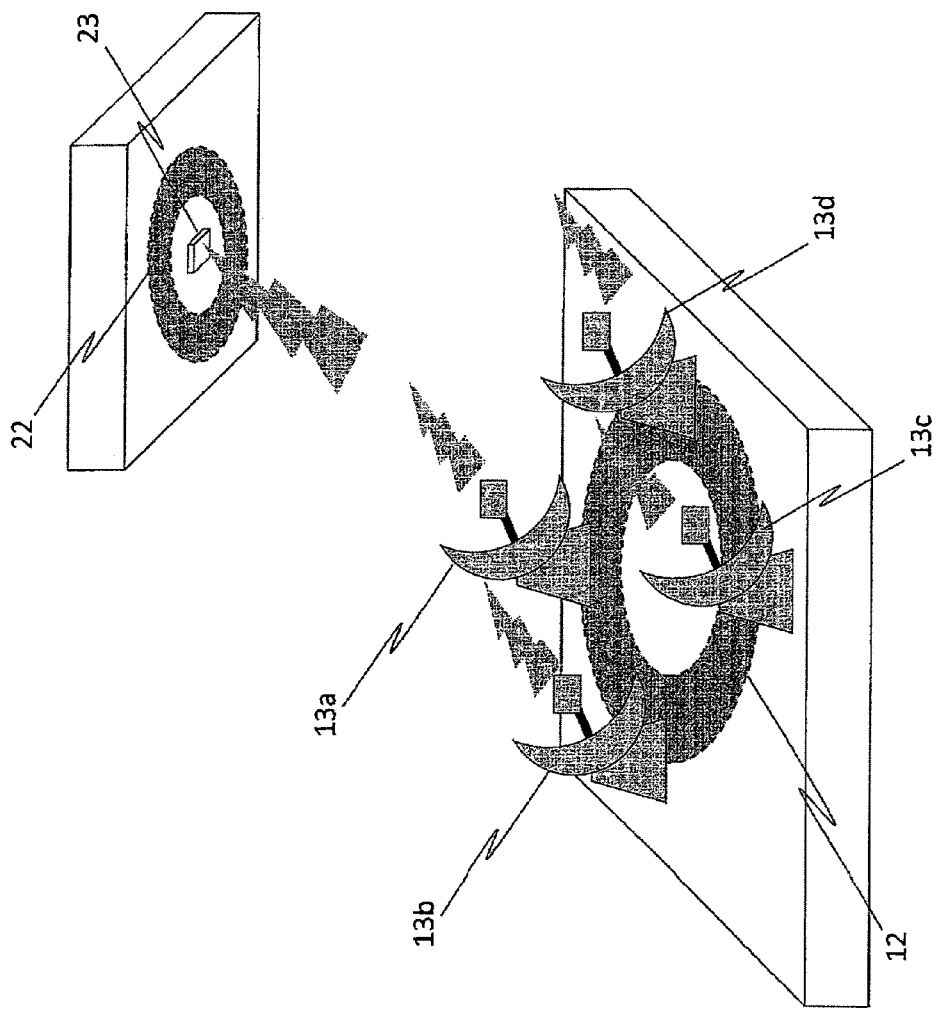
FIG. 2 is a perspective view of a power feeding coil, a signal receiving section, a power receiving coil, and a signal sending section, which are included in the contactless electricity supply system of FIG. 1.

The following describes configuration of signal receiving section 13 and signal sending section 23 with reference to FIG. 2. FIG. 2 is a perspective view of power feeding coil 12, signal receiving section 13, power receiving coil 22, and signal sending section 23, which are included in the contactless electricity supply device of this embodiment.

Signal receiving section 13 is composed of four signal receiving antennas 13*a*, 13*b*, 13*c*, 13*d* which are provided at the periphery of power feeding coil 12. Signal receiving antennas 13*a*, 13*b*, 13*c*, 13*d* are arranged in symmetry with respect to the center of power feeding coil 12. Signal sending section 23 is composed of a single signal sending antenna which is provided at the central point of signal sending section 23.

The positions of power feeding coil 12 and signal receiving section 13 are unchanged, because power feeding coil 12 and signal receiving section 13 are provided at electricity supply device 100 on the ground side. On the other hand, the positions of power receiving coil 22 and signal sending section 23 are changed with respect to the positions of power feeding coil 12 and signal receiving section 13, depending on the parking position of vehicle 200 with respect to the prescribed parking space, because power receiving coil 22 and signal sending section 23 are provided at vehicle 200.

Signal receiving section 13 and signal sending section 23 are arranged so that the distance between the position of each signal receiving antenna 13*a*, 13*b*, 13*c*, 13*d* and the position of signal sending section 23 is equal to each other when vehicle 200 is parked in the prescribed parking space so that the central point of power receiving coil 22 and the central point of power feeding coil 12 are identical to each other in the direction of the coil planes of power receiving coil 22 and power feeding coil 12, i.e. in the direction of the surfaces of power receiving coil 22 and power feeding coil 12.

Each signal receiving antenna 13*a*, 13*b*, 13*c*, 13*d* receives a signal sent from the antenna of signal sending section 23. When the central point of power receiving coil 22 and the central point of power feeding coil 12 are identical in the direction of the surfaces of power receiving coil 22 and power feeding coil 12, the strength of the signal received by each signal receiving antenna 13*a*, 13*b*, 13*c*, 13*d* is equal to each other. On the other hand, when the central point of power receiving coil 22 and the central point of power feeding coil 12 are deviated from each other, the strength of the signal received by each signal receiving antenna 13*a*, 13*b*, 13*c*, 13*d* is not equal to each other. Accordingly, in this embodiment, coil position deviation is detected by sensing the positional relationship between power feeding coil 12 and power receiving coil 22 based on the output values of the plurality of sensors configured in signal receiving section 13 and signal sending section 23 as described below.

The following describes a control performed by control section 15 and charging control section 25 with reference to FIGS. 1 and 2.

Control section 15 performs a system check as an initialization control, determining whether or not systems of electricity supply device 100 operate normally. Similarly, charging control section 25 performs a system check as an initialization control, determining whether or not a charging system of vehicle 200 operates normally. When the result of the system check indicates that a system abnormality is present in vehicle 200, control section 15 informs a user. When the result of the system check indicates that a system abnormality is present in electricity supply device 100, control section 15 notifies a center or the like that is managing the electricity supply device 100. On the other hand, when the system check is normal, control section 15 starts up the wireless communication section 14, and thereby establishes a condition where a signal can be received. For example, the system check for electricity supply device 100 is performed at intervals of a specified period, whereas the system check for vehicle 200 is performed when a main switch is turned on wherein the main switch serves to drive vehicle 200.

Control section 15 and charging control section 25 control wireless communication section 14 and wireless communication section 24, respectively, by the following remote communication control. First, charging control section 25 obtains information about present position of vehicle 200 by a GPS function provided in vehicle 200, and determines whether or not the present position of vehicle 200 is within a predetermined charging spot. The charging spot is set individually for electricity supply device 100, and is, for example, a region that is displayed on a map as a circle having a center at the position of electricity supply device 100. The condition that vehicle 200 is within the charging spot means that charging of battery 28 will be implemented by electricity supply device 100 corresponding to the charging spot.

When the present position of vehicle 200 is within the charging spot, charging control section 25 starts up the wireless communication section 24, and thereby allows communication between wireless communication section 14 and wireless communication section 24. When communication is allowed between wireless communication section 14 and wireless communication section 24, then charging control section 25 sends from wireless communication section 24 to wireless communication section 14 a signal for establishing a data link. Then, control section 15 sends back from wireless communication section 14 to wireless communication section 24 a signal indicates that control section 15 has received the signal. This process establishes the data link between wireless communication section 14 and wireless communication section 24.

Moreover, charging control section 25 sends an ID of vehicle 200 to control section 15 through communication between wireless communication section 14 and wireless communication section 24. Control section 15 performs ID authentication by determining whether or not the ID sent from vehicle 200 coincides with one of the registered IDs. In this contactless electricity supply system, chargeable vehicles 200 are proactively registered by ID in each electricity supply device 100. Accordingly, vehicle 200 can be supplied with electricity when the ID authentication indicates that the ID of vehicle 200 coincides with a registered ID.

When the data link is established and the ID authentication is finished, then charging control section 25 sends a signal from wireless communication section 24 to wireless communication section 14 at predetermined intervals, while vehicle 200 is approaching the electricity supply device 100 corresponding to the charging spot. Control section 15 measures the distance between vehicle 200 and electricity supply device 100 by distance measurement section 151. Wireless communication section 14 receives the signal sent periodically from wireless communication section 24. Distance measurement section 151 measures the distance between vehicle 200 and electricity supply device 100 based on the electric field strength of the received signal.

Control section 15 is provided with a threshold value that is set as a predetermined vehicle approach threshold value for indicating a condition that vehicle 200 has approached the electricity supply device 100 so that the distance between power feeding coil 12 and power receiving coil 22 in the direction of the surfaces of power feeding coil 12 and power receiving coil 22 becomes short. In this embodiment, the vehicle approach threshold value is prescribed in terms of signal strength, because the strength of the received signal is in correlation with the distance between vehicle 200 and electricity supply device 100.

Control section 15 compares the electric field strength of the received signal with the vehicle approach threshold value, and determines whether or not the distance between vehicle 200 and electricity supply device 100 is shorter than a prescribed value. When the distance between vehicle 200 and electricity supply device 100 is shorter than the prescribed value, then control section 15 starts up the signal receiving section 13, and sends a control signal from wireless communication section 14 to wireless communication section 24. Upon receipt of the control signal, charging control section 25 starts up the signal sending section 23.

In this way, in this embodiment, signal sending and receipt between signal receiving section 13 and signal sending section 23 is not constantly performed, but signal receiving section 13 and signal sending section 23 are started up to perform signal sending and receipt, when vehicle 200 has approached the electricity supply device 100.

After completing the remote communication control, control section 15 and charging control section 25 perform a position sensing control as follows. When recognizing that vehicle 200 gets stationary, charging control section 25 sends a signal from the signal sending antenna of signal sending section 23 to signal receiving antennas 13a, 13b, 13c, 13d of signal receiving section 13. Control section 15 measures the output value of the signal received by each signal receiving antenna 13a, 13b, 13c, 13d, and first determines whether or not signal receiving antennas 13a, 13b, 13c, 13d and the signal sending antenna are normal. Control section 15 is provided with an upper limit value and a lower limit value which are set as position determination threshold values for determining abnormality of the antennas. When all of the output values of signal receiving antennas 13a, 13b, 13c, 13d are in the range from the lower limit value to the upper limit value, then control section 15 determines that signal receiving section 13 and signal sending section 23 are operating normally. On the other hand, when the output value of signal receiving antenna 13a, 13b, 13c, 13d is higher than the upper limit value or lower than the lower limit value, then control section 15 determines that at least one of signal receiving section 13 and signal sending section 23 is failed. When determining that signal receiving section 13 or signal sending section 23 is failed, then control section 15 sends a signal indicating the abnormality, through wireless communication section 14 and wireless communication section 24 to charging control section 25. Then, charging control section 25 notifies the user of the abnormality of signal receiving section 13 or signal sending section 23. On the other hand, control section 15 notifies the center, which is managing the electricity supply device 100, of the abnormality of signal receiving section 13 or signal sending section 23.

Figures 4A, 4B, 4C:
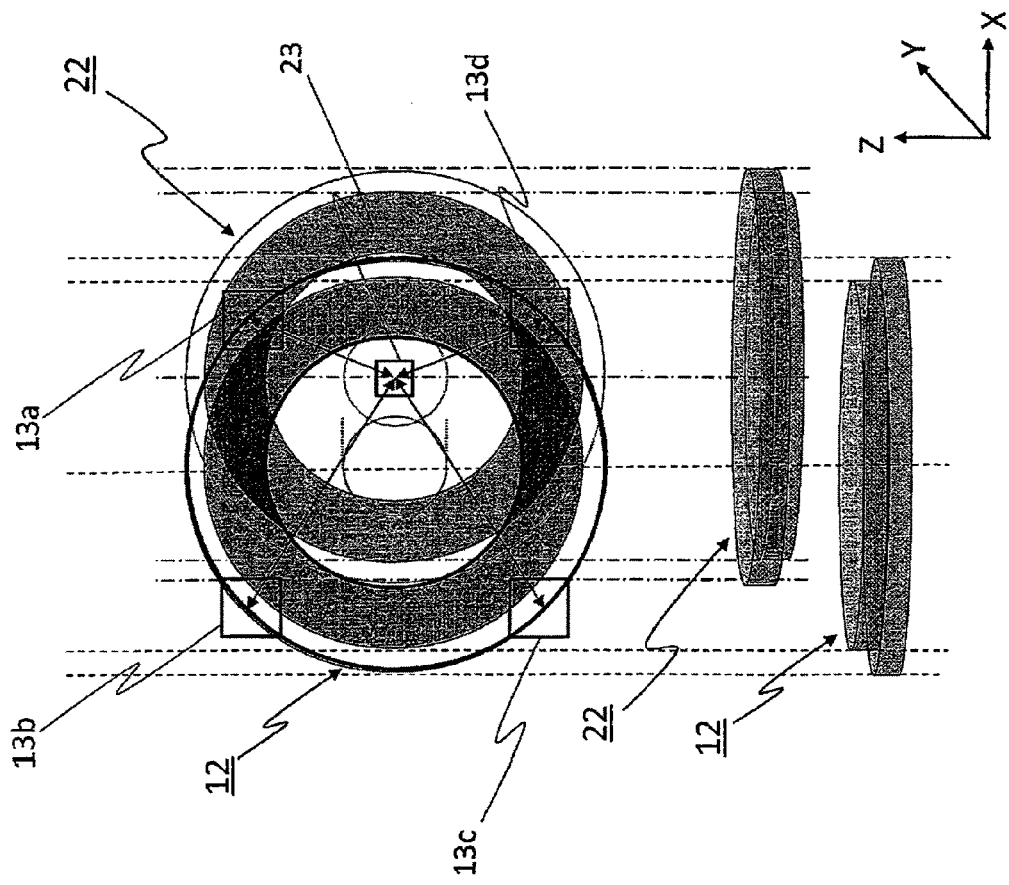
FIG. 4A is a plan view.
FIGS. 4B and 4C are perspective views.
Figures 5A, 5B, 5C:
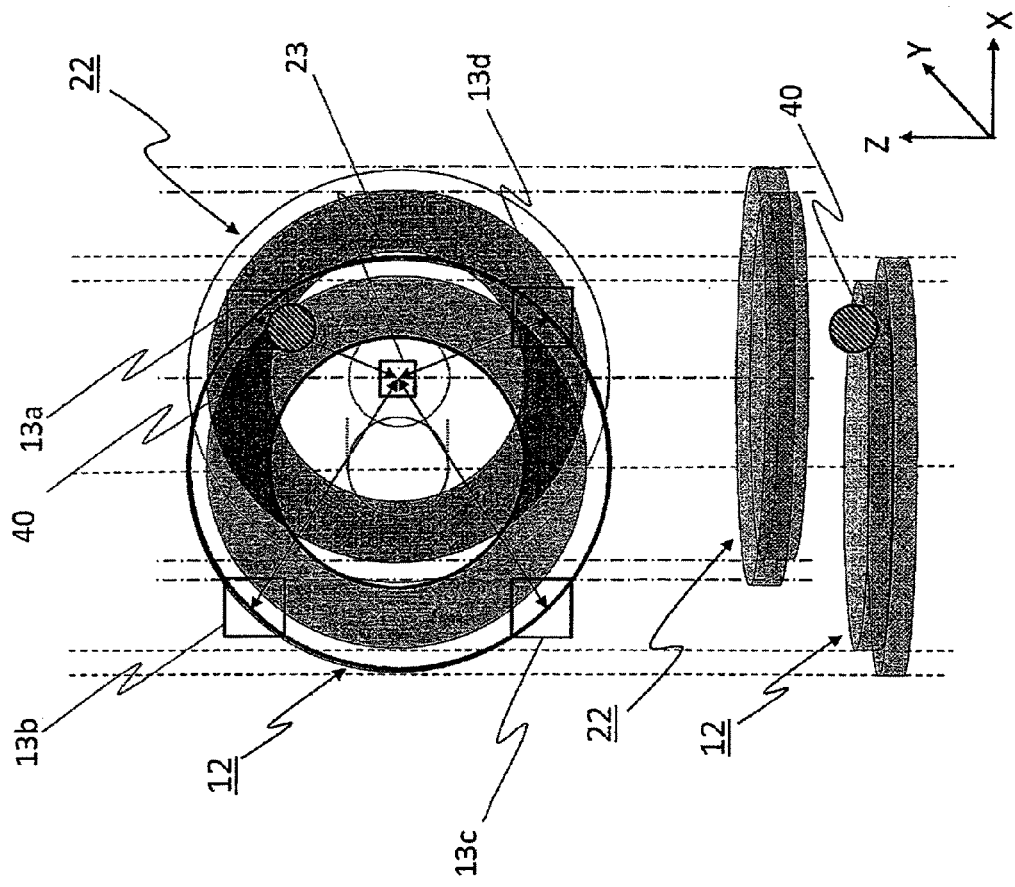
FIG. 5A is a plan view.
FIGS. 5B and 5C are perspective views.

When signal receiving section 13 and signal sending section 23 are normal, control section 15 detects a positional deviation between the coils, namely, detects a state of overlap between power feeding coil 12 and power receiving coil 22, by position sensing section 152, and detects a foreign object present between the coils by foreign object detection section 153, as follows. The following describes the control of detecting a positional deviation between the coils, and the control of detecting a foreign object between the coils with reference to FIGS. 3 to 5. FIG. 3 shows a condition where power feeding coil 12 and power receiving coil 22 face each other with no positional deviation, wherein FIG. 3A is a plan view, and FIGS. 3B and 3C are perspective views. FIG. 4 shows a condition where power feeding coil 12 and power receiving coil 22 face each other with a positional deviation, wherein FIG. 4A is a plan view, and FIGS. 4B and 4C are perspective views. FIG. 5 shows a condition where a foreign object 40 is present on power feeding coil 12 with respect to FIG. 4, wherein FIG. 5A is a plan view, and FIGS. 5B and 5C are perspective views. The X axis and Y axis represent the direction of the surfaces of power feeding coil 12 and power receiving coil 22, and the Z axis represents the direction of height.

When the central point of power feeding coil 12 and the central point of power receiving coil 22 are identical to each other in the direction of the surfaces of power feeding coil 12 and power receiving coil 22 as shown in FIG. 3, the distance from the signal sending antenna of signal sending section 23 to each signal receiving antenna 13a, 13b, 13c, 13d of signal receiving section 13 is equal to each other so that the output value of the signal received by signal receiving antenna 13a, 13b, 13c, 13d is equal to each other. The output value of each signal receiving antenna 13a, 13b, 13c, 13d for the situation shown in FIG. 3 is represented by "S".

On the other hand, when power receiving coil 22 is deviated in the direction of the X-axis with respect to power feeding coil 12 as shown in FIG. 4, the distance from signal sending section 23 to signal receiving antenna 13a, 13d becomes shorter than the distance from signal sending section 23 to signal receiving antenna 13b, 13c. The distance from signal sending section 23 to signal receiving antenna 13a, 13d is shorter than the distance from signal sending section 23 to signal receiving antenna 13a, 13b, 13c, 13d under the condition shown in FIG. 3, so that the output value of signal receiving antenna 13a, 13d is greater than the output value S, and equal to S+30, for example. On the other hand, the distance from signal sending section 23 to signal receiving antenna 13b, 13c is longer than the distance from signal sending section 23 to signal receiving antenna 13a, 13b, 13c, 13d under the condition shown in FIG. 3, so that the output value of signal receiving antenna 13b, 13c is less than the output value S, and equal to S−30, for example.

Accordingly, position sensing section 152 senses the relative position of power receiving coil 22 with respect to power feeding coil 12 by comparing the output values of signal receiving antennas 13a, 13b, 13c, 13d with the output value S as a reference, and calculating the deviation of the output value of each signal receiving antenna 13a, 13b, 13c, 13d.

The following describes a control process for foreign object detection, which is performed by foreign object detection section 153. As shown in FIG. 5, when a foreign object 40 is present close to signal receiving antenna 13a under a similar positional relationship of the coils as shown in FIG. 4, the signal sent from signal sending section 23 to signal receiving antenna 13a is interrupted by foreign object 40 so that the output value of signal receiving antenna 13a becomes smaller than the output value of signal receiving antenna 13a under the condition shown in FIG. 4, (S+30), and equal to S−600, for example. On the other hand, the out values of signal receiving antennas 13b, 13c, 13d are equal to S−30, S−30, S+30, respectively, as in the case of FIG. 4.

Foreign object detection section 153 obtains the absolute values of differences among the output values of signal receiving antennas 13a, 13b, 13c, 13d, and compares the absolute value of each difference with a threshold value, and when the difference is greater than the threshold value, determines that a foreign object is present between the coils. The threshold value is a predetermined foreign object identification threshold value used to determine whether or not a foreign object is present. In this embodiment, the foreign object identification threshold value is set to 60. In the examples shown in FIGS. 4 and 5, the output values of signal receiving antennas 13a, 13b, 13c, 13d are represented by a, b, c, and d, respectively. In the example shown in FIG. 4, the absolute value of each difference is calculated by foreign object detection section 153 as follows.

$$|b-a|=60, |c-a|=60, |d-a|=0,$$

$$|c-b|=0, |d-b|=60, \text{ and } |d-c|=60$$

Foreign object detection section 153 compares the absolute value of each difference with the foreign object identification threshold value, and determines that every difference is smaller than or equal to the foreign object identification threshold value (=60), and thereby determines that no foreign object is present between power feeding coil 12 and power receiving coil 22. On the other hand, in the example shown in FIG. 5, the absolute value of each difference is calculated by foreign object detection section 153 as follows.

$$|b-a|=570, |c-a|=570, |d-a|=630,$$

$$|c-b|=0, |d-b|=60, \text{ and } |d-c|=60$$

Foreign object detection section 153 compares the absolute of each difference with the foreign object identification threshold value, and determines that the differences |b−a|, |c−a|, and |d−a| are greater than the foreign object identification threshold value, and thereby determines that a foreign object is present. Since the output value a is common between the differences greater than the foreign object identification threshold value, foreign object detection section 153 can determine that a foreign object is present close to signal receiving antenna 13a. In this way, foreign object detection section 153 determines whether or not a foreign object is present between power feeding coil 12 and power receiving coil 22, and also determines the location of the foreign object. Control section 15 sends to vehicle 200 through the communication between wireless communication section 14 and wireless communication section 24 the relative position of power receiving coil 22 with respect to power feeding coil 12 which is detected by position sensing section 152. Moreover, control section 15 sends a signal to vehicle 200 through the communication between wireless communication section 14 and wireless communication section 24, when a foreign object is detected by foreign object detection section 153.

After completing the position sensing control, control section 15 and charging control section 25 perform the following charging control. Charging control section 25 calculates a charging period based on the information about coil position deviation which is received by wireless communication section 24. The efficiency of transmission of electric power supplied from power feeding coil 12 to power receiving coil 22 depends on the coefficient of coupling between power feeding coil 12 and power receiving coil 22, and the coefficient of coupling depends on the positional relationship between power feeding coil 12 and power receiving coil 22. Accordingly, charging control section 25 can calculate the power received by power receiving coil 22, based on the power sent from power feeding coil 12, if recognizing the positional relationship between power feeding coil 12 and power receiving coil 22. Moreover, charging control section 25 can calculate the charging period, based on the charging power corresponding to the received power based on coil position deviation, and the SOC of battery 28 managed by the controller not shown. When a user decides to permit charging operation during the charging period calculated by charging control section 25, charging control section 25 then sends to electricity supply device 100 through the communication between wireless communication section 14 and wireless communication section 24 a signal indicating a start of charging, in response to operation of the user. In response to the signal, control section 15 starts charging operation. On the other hand, when the user decides not to permit charging operation during the charging period calculated by charging control section 25, the user redoes parking in order to reduce the coil position deviation, and thereby shorten the charging period. When battery 28 is fully charged, then charging control section 25 sends from wireless communication section 24 to wireless communication section 14 a control signal indicating a termination of charging, so that control section 15 stops charging operation based on the control signal.

When charging control section 25 receives from wireless communication section 24 a signal indicating detection of a foreign object, then charging control section 25 notifies the user of the presence of the foreign object through the controller not shown. The user can start charging after removing the foreign object based on the notification. Upon detection of a foreign object, control section 15 does not perform charging operation.

Figure 6:
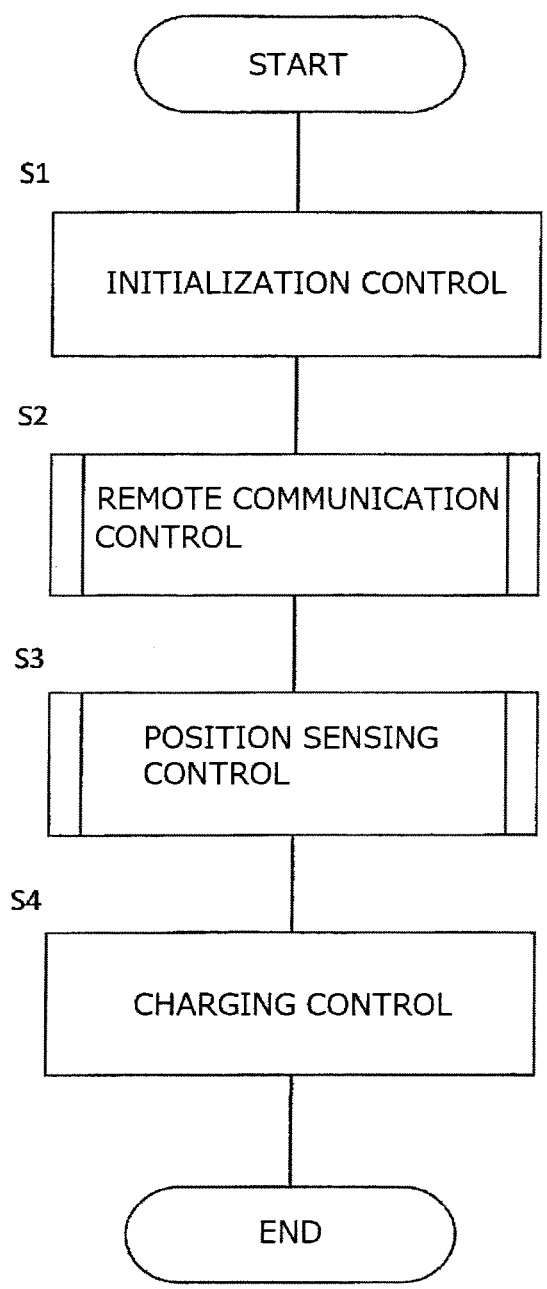
FIG. 6 is a flow chart showing a control process of a contactless electricity supply device included in the contactless electricity supply system of FIG. 1.
Figure 7:
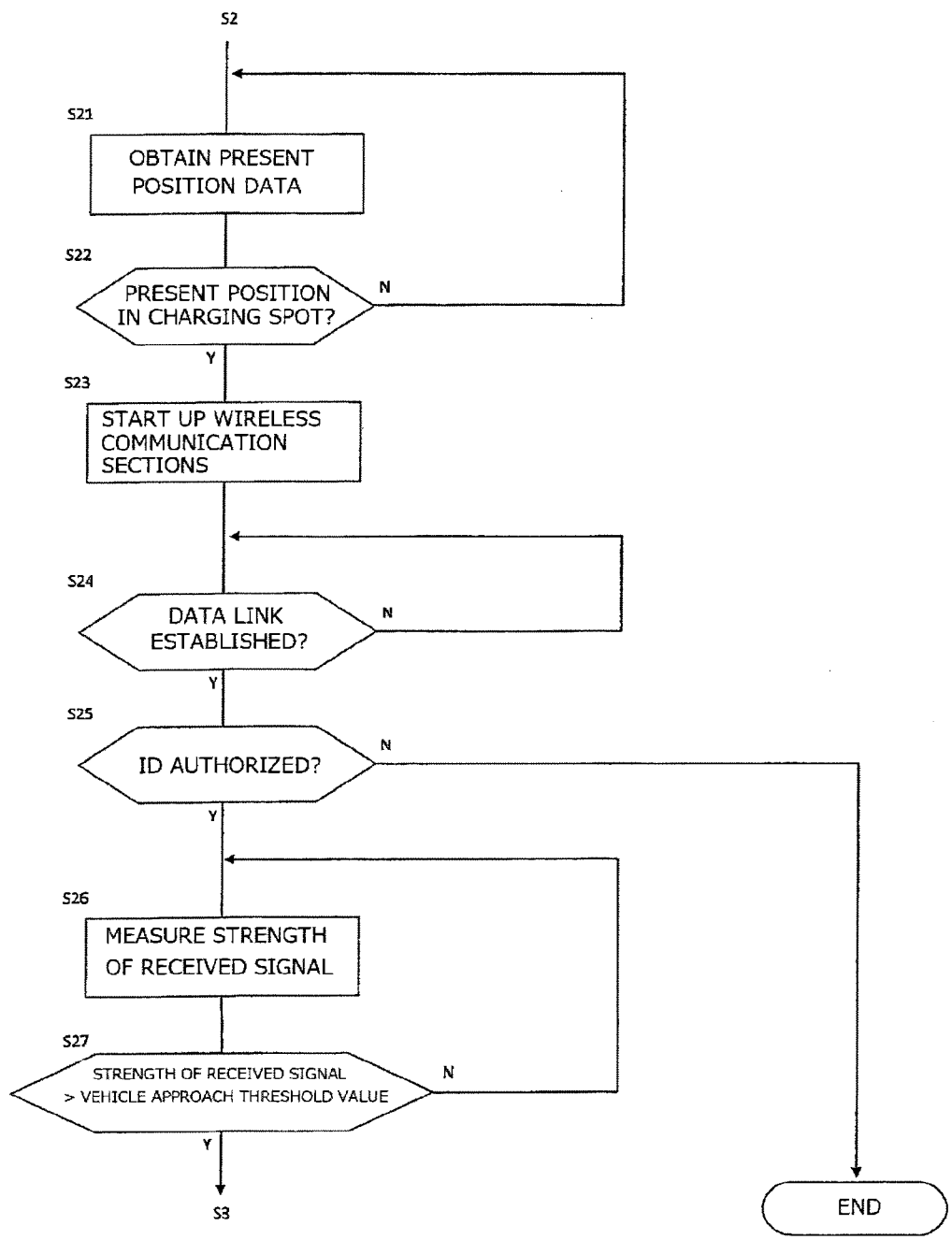
FIG. 7 is a flow chart showing a control process of a remote communication control shown in FIG. 6.
Figure 8:
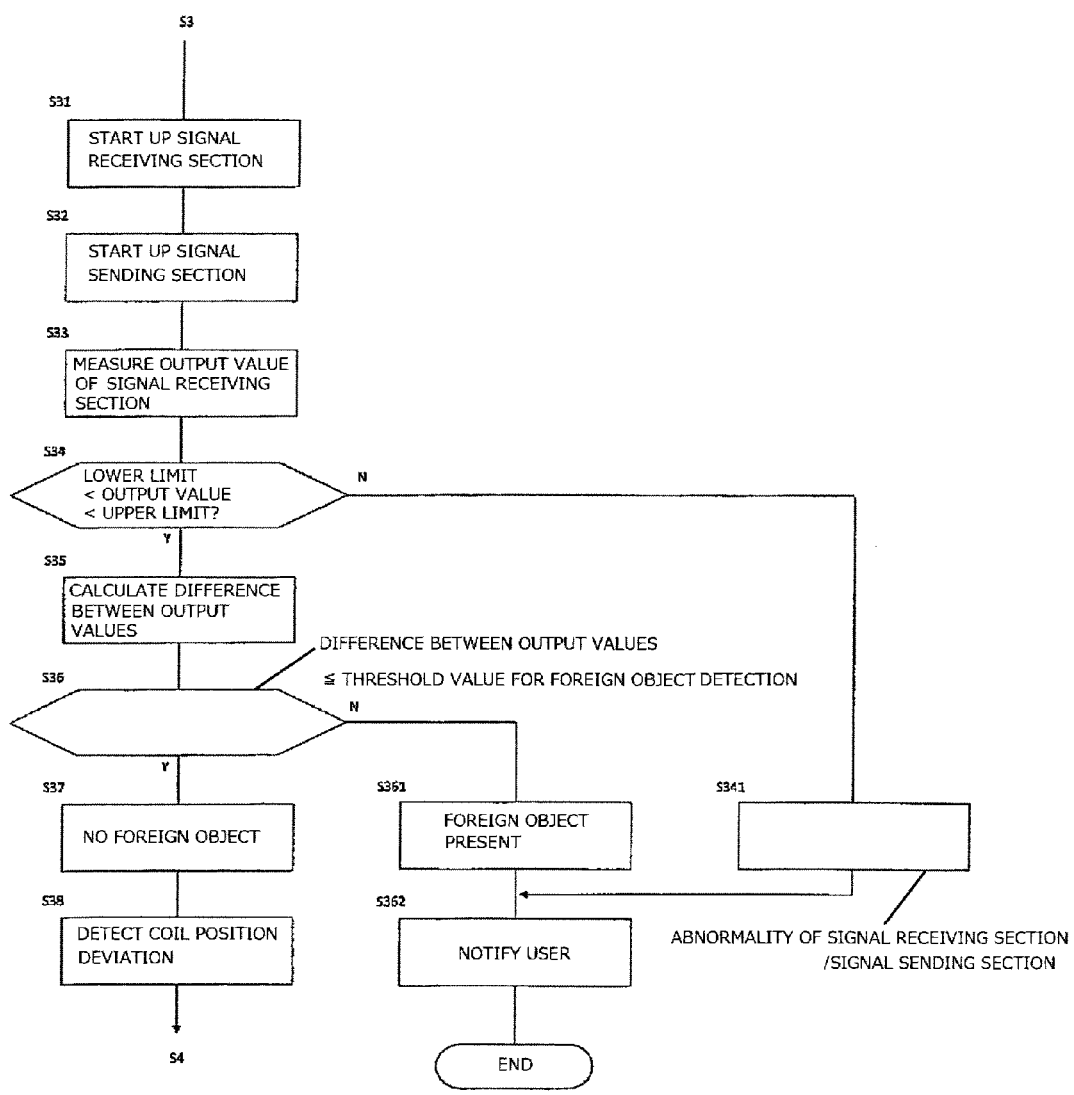
FIG. 8 is a flow chart showing a control process of a position sensing control shown in FIG. 6.

The following describes a control process performed by the contactless electricity supply system according to the present embodiment, with reference to FIGS. 6 to 8. FIG. 6 is a flow chart showing a control process of the contactless electricity supply system according to the present embodiment. FIG. 7 is a flow chart showing a control process of a remote communication control shown in FIG. 6. FIG. 8 is a flow chart showing a control process of a position sensing control shown in FIG. 6.

At Step S1, control section 15 and charging control section 25 perform a system check as an initialization control. At Step S2, control section 15 and charging control section 25 perform a remote communication control.

With regard to the remote communication control at Step S2, charging control section 25 obtains the present position of vehicle 200 by the GPS function of the controller not shown, at Step S21, as shown in FIG. 6. At Step S22, charging control section 25 determines whether or not the obtained present position is within the charging spot of electricity supply device 100. When the present position is not within the charging spot, the control process then returns to Step S21. When the present position is within the charging spot, charging control section 25 then starts up wireless communication section 24 at Step S23.

At Step S24, control section 15 and charging control section 25 perform signal sending and receipt between wireless communication section 14 and wireless communication section 24 for establishing a data link, and determine whether or not a data link has been established. When no data link is established, the control process returns to Step S24 where signal sending and receipt is redone between wireless communication section 14 and wireless communication section 24. When a data link is established, charging control section 25 sends the ID of vehicle 200 to electricity supply device 100 at Step S25. Control section 15 performs ID authorization by checking IDs contained in the signal received by wireless communication section 14 against the IDs registered in electricity supply device 100.

When the ID authorization is failed, then the control process of this embodiment is terminated. On the other hand, when the ID authorization is successful, charging control section 25 sends signals from wireless communication section 24 at intervals of a predetermined period for informing that vehicle 200 is approaching the electricity supply device 100, at Step S26. Control section 15 measures the distance between vehicle 200 and electricity supply device 100 by allowing the distance measurement section 151 to measure the electric field strength of the signal received by wireless communication section 14. Then, at Step S27, control section 15 determines whether or not the electric field strength of the received signal is greater than the vehicle approach threshold value. When the electric field strength of the received signal is less than or equal to the vehicle approach threshold value, it is determined that the approach of vehicle 200 to electricity supply device 100 is insufficient for starting up the signal receiving section 13 and signal sending section 23 for detection of coil position deviation, and thereby the control process returns to Step S26. On the other hand, when the electric field strength of the received signal is greater than the vehicle approach threshold value, it is determined that the approach of vehicle 200 to electricity supply device 100 is sufficient, and thereby the control process returns to Step S3 so that the remote communication control is terminated.

With regard to the position sensing control at Step S3, control section 15 starts up signal receiving section 13, and sends from wireless communication section 14 to wireless communication section 24 a signal indicating a start of the position sensing control, at Step S31, as shown in FIG. 8. At Step S32, charging control section 25 starts up signal sending section 23, depending on the signal sent at Step S31. At Step S33, control section 15 measures the output values of the signals that are sent from signal sending section 23 and received by signal receiving antennas 13a, 13b, 13c, 13d of signal receiving section 13. At Step S34, control section 15 determines whether or not the output value of each received signal is greater than the lower limit of abnormality check, and less than the upper limit of abnormality check.

When the output values of the received signals are greater than the lower limit and less than the upper limit, then control section 15 calculates differences among the output values of the signals received by signal receiving antennas 13a, 13b, 13c, 13d, at Step S35. At Step S36, control section 15 makes foreign object detection section 153 to determine whether or not the absolute value of each output value difference is less than or equal to the foreign object detection threshold value. When the absolute value of each output value difference is less than or equal to the foreign object detection threshold value, foreign object detection section 153 determines at Step S37 that no foreign object is present between power feeding coil 12 and power receiving coil 22. At Step S38, control section 15 makes position sensing section 152 to sense the relative position of power receiving coil 22 with respect to power feeding coil 12 based on the output values of signal receiving antennas 13a, 13b, 13c, 13d which are measured at Step S33, and thereby senses a position deviation of power receiving coil 22 from power feeding coil 12, and sends to vehicle 200 a result of sensing, and then the control proceeds to Step S4 so that the position sensing control is terminated.

Referring back to Step S36, when the absolute values of the differences among the output values of signal receiving antennas 13a, 13b, 13c, 13d are greater than the foreign object detection threshold value, foreign object detection section 153 determines at Step S361 that a foreign object is present. Then, at Step S362, control section 15 sends to vehicle 200 through wireless communication section 14 a signal indicating the presence of the foreign object. Charging control section 25 notifies the user of the presence of the foreign object, based on the signal received by wireless communication section 24. When the foreign object is present, the control process of this embodiment is terminated without proceeding to the charging control at Step S4.

Referring back to Step S34, when the output values of signal receiving antennas 13a, 13b, 13c, 13d are less than the lower limit or greater than the upper limit, control section 15 determines that an abnormality is present in signal receiving section 13 or signal sending section 23, at Step S341. Then, at Step S362, control section 15 sends to vehicle 200 through wireless communication section 14 a signal indicating that the abnormality is present in signal receiving section 13 or signal sending section 23. Charging control section 25 notifies the user of the presence of the abnormality, based on the signal received by wireless communication section 24. When the abnormality is present in signal receiving section 13 or signal sending section 23, the control process of this embodiment is terminated without proceeding to the charging control at Step S4.

Referring back to FIG. 6, at Step S4, charging control section 25 calculates the charging period, based on the information about coil position deviation sensed by position sensing section 152 and the SOC of battery 28, and notifies the user of the charging period. Then, depending on operation of the user, charging control section 25 sends to electricity supply device 100 a signal indicating a start of charging. When receiving the signal, control section 15 then starts to supply electricity from power feeding coil 12 to power receiving coil 22. At the start of charging, control section 15 stops signal receiving section 13, whereas charging control section 25 stops signal sending section 23. Then, when battery 28 is fully charged, control section 15 stops electricity supply, and terminates the charging control of this embodiment.

As described above, the present embodiment is provided with signal sending section 23 and signal receiving antennas 13a, 13b, 13c, 13d, and senses with position sensing section 152 the positional relationship between power feeding coil 12 and power receiving coil 22 based on the output values of signal receiving antennas 13a, 13b, 13c, 13d, and detects with foreign object detection section 153 a foreign object between power feeding coil 12 and power receiving coil 22 based on a result of comparison among the output values of signal receiving antennas 13a, 13b, 13c, 13d. This feature of the present embodiment makes it possible to detect a foreign object between the coils by using signal sending section 23 and signal receiving antennas 13a, 13b, 13c, 13d which are sensors for sensing the positional relationship between power feeding coil 12 and power receiving coil 22. This eliminates the necessity of providing an additional sensor for foreign object detection. The present embodiment makes it possible to remove a foreign object between the coils by detecting the foreign object, and notifying the user or the like of the presence of the foreign object, and thereby makes it possible to prevent the foreign object from producing heat due to contactless electricity supply. The feature of the present embodiment that foreign object detection is implemented with a plurality of sensors, makes it possible to identify the location of the foreign object.

In the present embodiment, foreign object detection section 153 is made to detect a foreign object based on the differences among the output values of signal receiving antennas 13a, 13b, 13c, 13d. The feature that the differences are obtained among the output values of signal receiving antennas 13a, 13b, 13c, 13d, serves to cancel the deviation of the output values due to coil position deviation, and thereby enhance the accuracy of foreign object detection.

In this embodiment, when a foreign object is detected by foreign object detection section 153, the coil position sensing is not performed by position sensing section 152. However, when a foreign object is present at a position significantly closer to one of the signal receiving antennas 13a, 13b, 13c, 13d than the other signal receiving antennas, the positional relationship between power feeding coil 12 and power receiving coil 22 may be sensed by position sensing section 152 based on the output values of the remaining three signal receiving antennas. This makes it possible to achieve both of coil position deviation sensing and foreign object detection, and thereby provide a more convenient contactless electricity supply system.

Although signal receiving section 13 is composed of four antennas in the present embodiment, signal receiving section 13 is not limited to this configuration, but may be composed of a plurality of antennas other than four. Signal receiving section 13 does not need to be provided at the ground side, but may be provided at vehicle 200. Signal sending section 23 does not need to be provided at vehicle 200, but may be provided at the ground side. In the present embodiment, the signal sending antenna of signal sending section 23 and the signal receiving antennas 13a, 13b, 13c, 13d of signal receiving section 13 constitute the plurality of sensors. However, the plurality of sensors do not need to be constituted by the pair of signal sending section 23 and signal receiving section 13, but may be constituted by sensors provided at only one of the ground side and the side of vehicle 200. For example, the foreign object detection and coil position sensing may be implemented by providing a plurality of infrared sensors at the ground side which infrared sensors emit light toward vehicle 200, and referring to the strength of the reflected infrared light.

Although foreign object detection section 153 detects a foreign object based on the differences among the output values of signal receiving antennas 13a, 13b, 13c, 13d in the present embodiment, foreign object detection section 153 may detect a foreign object by processing the output values of signal receiving antennas 13a, 13b, 13c, 13d by multiplication, addition, or subtraction, and comparing results of the calculations.

In the present embodiment, foreign object detection section 153 may perform the foreign object detection, while electric power is being supplied from power feeding coil 12 to power receiving coil 22. When foreign object detection section 153 detects a foreign object during electric power supply, control section 15 then stops electricity sending from power feeding coil 12, and notifies through wireless communication the vehicle side 200 of the event that the foreign object is present.

Since the distance measurement based on communication between wireless communication section 14 and wireless communication section 24 is greater in unit of measurement than the coil position deviation sensing based on communication between signal receiving section 13 and signal sending section 23, the cycle of communication between wireless communication section 14 and wireless communication section 24 may be set longer than the cycle of communication between signal receiving section 13 and signal sending section 23. The amount of data sent by the communication between signal receiving section 13 and signal sending section 23 may be small, because bidirectional communication of control signals is not performed between signal receiving section 13 and signal sending section 23 as between wireless communication section 14 and wireless communication section 24. However, it is preferable to perform a parity check during the system check, in order to enhance the accuracy of position deviation between the coils.

Position sensing section 152 may perform the coil position sensing, while electric power is being supplied from power feeding coil 12 to power receiving coil 22. For example, control section 15 may be controlled to stop electric power supply a predetermined period after performing electric power supply, and sense the position of the coils by position sensing section 152 while electric power supply is being stopped, and after the sensing, restart electric power supply. This makes it possible to confirm whether or not coil position deviation occurs during electric power supply.

Although the distance between vehicle 200 and electricity supply device 100 is measured based on the strength of the signal received by wireless communication section 14, it may be measured based on a time difference about the received signal or the like. As a communication means for remote communication for distance measurement, a sensor may be provided which measures directly the distance between vehicle 200 and electricity supply device 100.

One of the power feeding coil 12 and power receiving coil 22 corresponds to the first coil of the present invention, whereas the other coil corresponds to the second coil of the present invention. Signal sending section 23 and signal receiving antennas 13a, 13b, 13c, 13d of signal receiving section 13 correspond to the plurality of sensors of the present invention. Position sensing section 152 corresponds to the position sensing means of the present invention. Foreign object detection section 153 corresponds to the foreign object detection means of the present invention.

The invention claimed is:

1. A contactless electricity supply device comprising:
    a second coil that sends or receives electricity to or from a first coil contactlessly at least through magnetic coupling therebetween;
    a plurality of sensors for sensing a positional deviation between the first coil and the second coil;
    a position sensing section that compares output values of the plurality of sensors with a predetermined reference value, and senses a positional relationship between the first coil and the second coil; and
    a foreign object detection section that compares a difference among the same output values of the plurality of sensors with a predetermined threshold value for foreign object detection, and detects whether or not a foreign object is present between the first coil and the second coil on a basis of a result of the comparison.

2. The contactless electricity supply device as claimed in claim 1, wherein:
    the plurality of sensors include four sensors;
    the position sensing section is configured to input output values of the four sensors;

the foreign object detection section is configured to input the same output values of the four sensors; and the position sensing section is configured to detect the positional relationship between the first coil and the second coil on a basis of at least three output values of the same output values of the four sensors.

3. The contactless electricity supply device as claimed in claim 1, wherein the plurality of sensors includes a signal sending section including a single signal sending antenna which is provided at a central point of the signal sending section, and a signal receiving section including a plurality of signal receiving antennas;

the signal sending section and the signal receiving section are arranged such that a distance between a position of each of the signal receiving antennas and a position of the signal sending section is equal to each other in a case where a central point of the first coil and a central point of the second coil are positioned along a line in a depth direction of coil planes of the first and second coils; and the foreign object detection section is configured to obtain absolute values of differences among the same output values of the plurality of sensors, to compare each difference with the predetermined threshold value for the foreign object detection, and to detect whether or not the foreign object is present between the first coil and the second coil on the basis of the result of the comparison.

\* \* \* \* \*